US009805188B2

(12) United States Patent
Wesie et al.

(10) Patent No.: US 9,805,188 B2
(45) Date of Patent: Oct. 31, 2017

(54) CONTROL FLOW INTEGRITY SYSTEM AND METHOD

(71) Applicant: Kaprica Security, Inc., Washington, DC (US)

(72) Inventors: Andrew Michael Wesie, Austin, TX (US); Brian Sejoon Pak, Austin, TX (US)

(73) Assignee: RunSafe Security, Inc., McLean, VA (US)

( * ) Notice: Subject to any disclaimer, the term of this patent is extended or adjusted under 35 U.S.C. 154(b) by 0 days.

(21) Appl. No.: 14/538,643

(22) Filed: Nov. 11, 2014

(65) Prior Publication Data

US 2015/0135313 A1      May 14, 2015

Related U.S. Application Data

(60) Provisional application No. 61/903,137, filed on Nov. 12, 2013, provisional application No. 61/903,091, filed on Nov. 12, 2013.

(51) Int. Cl.
*G06F 21/51* (2013.01)
*G06F 9/445* (2006.01)
*G06F 21/54* (2013.01)
*G06F 9/45* (2006.01)

(52) U.S. Cl.
CPC ............... *G06F 21/51* (2013.01); *G06F 8/53* (2013.01); *G06F 9/445* (2013.01); *G06F 9/44521* (2013.01); *G06F 9/44568* (2013.01); *G06F 21/54* (2013.01); *G06F 2221/033* (2013.01)

(58) Field of Classification Search
CPC ...... G06F 21/51; G06F 9/44521; G06F 9/445; G06F 2221/033
See application file for complete search history.

(56) References Cited

U.S. PATENT DOCUMENTS 7,962,798 B2 * 6/2011 Locasto .............. G06F 11/1438
714/38.1
8,151,349 B1    4/2012 Yee et al.
(Continued)

OTHER PUBLICATIONS

International Search Report and Written Opinion issued by the U.S. Patent and Trademark Office as International Searching Authority for International Application No. PCT/US2014/065063 mailed Feb. 12, 2015 (8 pages).

(Continued)

*Primary Examiner* — Jung Kim
*Assistant Examiner* — Thomas Ho
(74) *Attorney, Agent, or Firm* — Wilmer Cutler Pickering Hale and Dorr LLP

(57) ABSTRACT

An improved CFI system and method is described that provides security from attacks to hijack computer software. The improved CFI system and method inserts two tags to execute label identification. The first tag is positioned before any instruction that would result in an indirect control flow transfer and requires the program to execute a check. The second tag is located before the first line of any legitimate transfer destination and when discovered by the tag check allows a program to carry out the indirect transfer. This tag orientation does not prevent transfers to targets other than the origin instruction's specific intended destination but limits transfers to destinations that begin with the proper label dedication. Although, an incorrect address may be called, that will be within the software program's assortment of legitimate indirect transfer targets. Attempts to exploit or reroute indirect transfers outside of the established control flow are eliminated.

21 Claims, 10 Drawing Sheets

(56) References Cited

U.S. PATENT DOCUMENTS

| | | | | |
|---|---|---|---|---|
| 8,424,082 B2* | 4/2013 | Chen | ................ | G06F 21/53 |
| | | | | 713/167 |
| 8,924,782 B2* | 12/2014 | Locasto | ............ | G06F 11/3672 |
| | | | | 714/15 |
| 9,058,483 B2* | 6/2015 | Chen | ................ | G06F 21/51 |
| 2012/0088584 A1 | 4/2012 | Mamtani et al. | | |
| 2013/0219116 A1 | 8/2013 | Wang et al. | | |

OTHER PUBLICATIONS

Richard Wartell et al., "Securing Untrusted Code Via Compiler-Agnostic Binary Rewriting," ACSAC '12, Proceedings of the 28th Annual Computer Security Applications Conference, Orlando, Florida, Dec. 3, 2012, pp. 299-308.

Aravind Prakash etal., "Enforcing System-Wide Control Flow Integrity for Exploit Detection and Diagnosis," Proceedings of the 8th ACM SIGSAC Symposium on Information, Computer amd Communications Security, ASIA CCS '13, May 1, 2013, pp. 311-322.

Eiitaro Shioji, et al., "Code Shredding: Byte-Granular Randomization of Program Layout for Detecting Code-Reuse Attacks," ACSAC '12, Proceedings of the 28th Annual Computer Security Applications Conference, Dec. 3, 2012, pp. 309-318.

Chao Zhang, et al., "Practical Control Flow Integrity and Randomization for Binary Executables," 2013 IEEE Symposium on Security and Privacy, IEEE, May 19, 2013, pp. 559-573.

European Supplementary Search Report dated Jun. 7, 2017 in related European Patent Application No. 14862578.3, 5 pages.

* cited by examiner

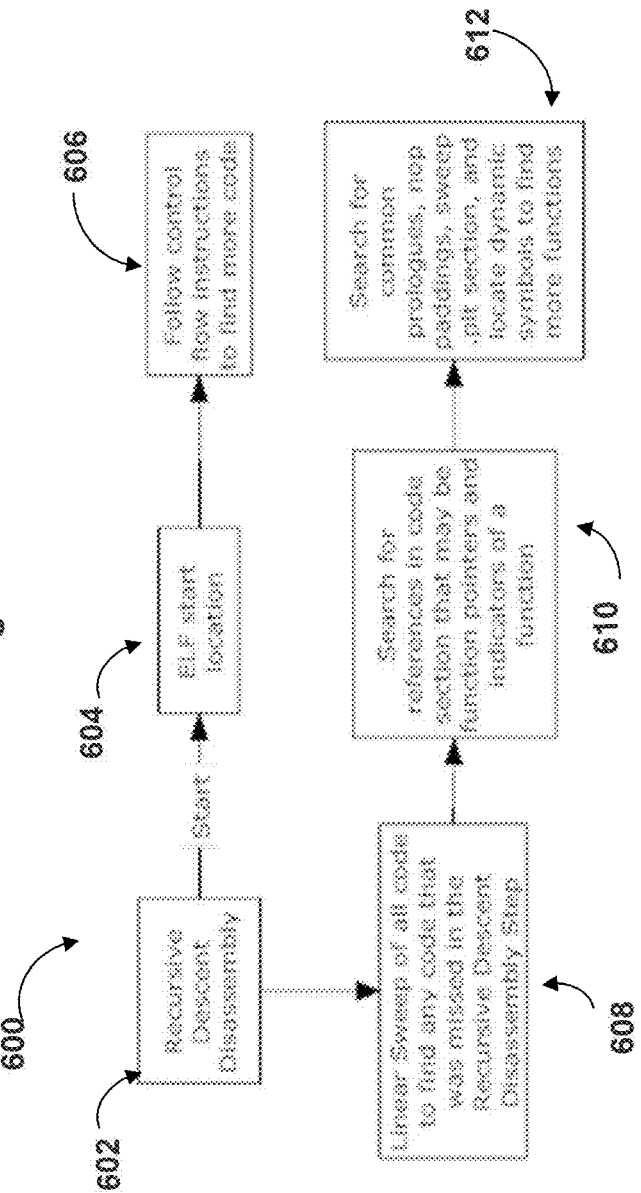

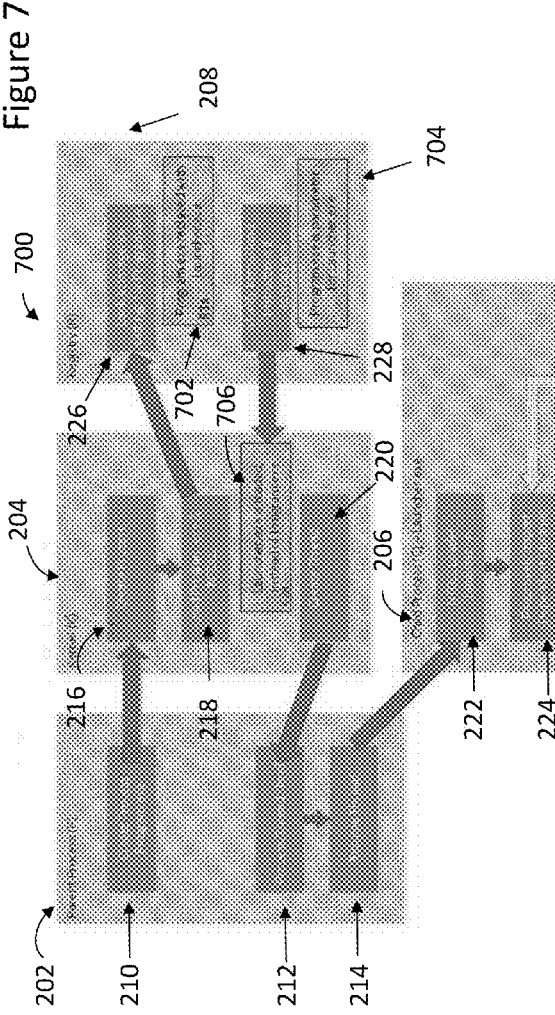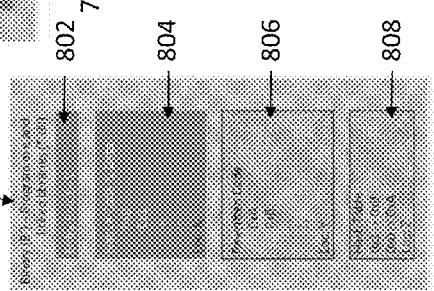

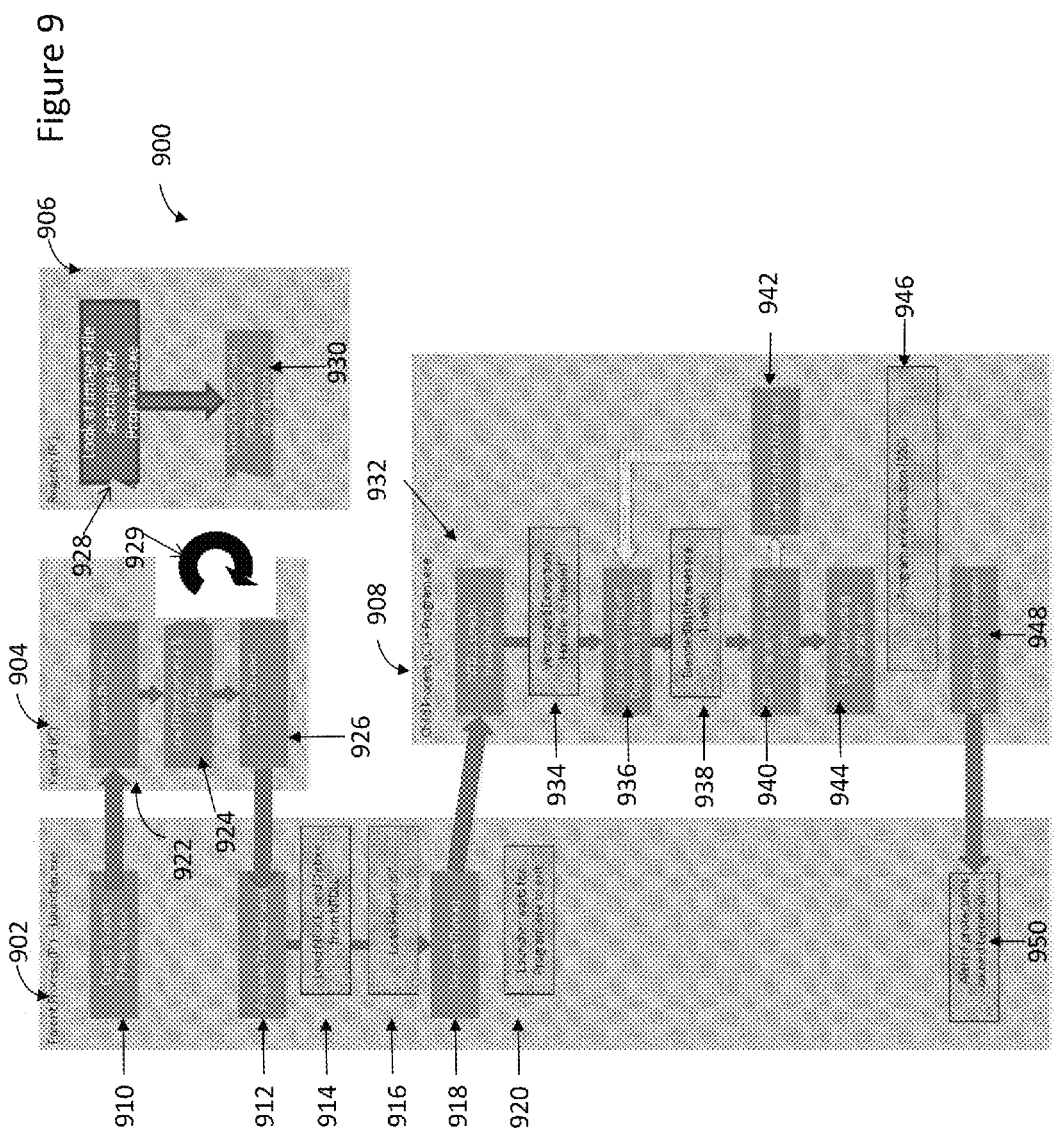

CONTROL FLOW INTEGRITY SYSTEM AND METHOD

RELATED APPLICATIONS

This application claims the benefit of U.S. Provisional Application No. 61/903,091, filed Nov. 12, 2013, entitled "Poor Man's Control Flow Integrity Security System" and U.S. Provisional Application No. 61/903,137, filed Nov. 12, 2013, entitled "Binary Control Flow Integrity Security System", the contents of each of which are incorporated herein by reference.

BACKGROUND OF THE INVENTION

Computers are subject to external attacks that can affect their operation. These attacks seek to exploit flaws in the software. The ultimate result of this exploitation is to subvert execution and gain control of the software behavior—in a sense, hijack the computer.

One of the methods used to protect against the hijacking of computer software is the use of the enforcement of Control Flow Integrity ("CFI"). CFI is a binary transformation method that protects indirect control transfers in the form of calls, returns and indirect jumps, and by tagging control transfers and valid destinations with identifier strings. A control transfer can only jump to an address if the tag at the destination matches the tag at the control transfer. Each control transfer may have many potential targets, which will all have identical tags. Any transfers that target the same address also will have identical tags.

The purpose of CFI systems is to limit the control flow of programs to only control transfers that exist in the program when operating normally. These systems will validate return addresses and functions pointers at runtime to prevent attackers from redirecting control to arbitrary addresses. As such, attempted attacks to hijack the control flow can only redirect the control flow to a limited set of locations that have been explicitly allowed rather than to any location in the address space.

As to CFI enforcement, it is carried out through the use of a Control Flow Graph ("CFG"). The CFG dictates the software execution path. Conventionally, the CFG can be defined by analysis, such as, source-code analysis, binary analysis, or execution profiling. CFI enforcement that uses CFG has been found to be effective against a range of common attacks since abnormal control-flow modifications is an essential step in many exploits.

When implemented during program execution, CFI requires that whenever a machine-code instruction transfers control, it targets a valid destination as defined by a CFG created ahead of time. Since most instructions target a consistent destination, this requirement can usually be handled statically. However, for computed control-flow transfers, which are those whose destination is determined at runtime, this requirement must be handled with a dynamic check. Machine-code rewriting is a relatively straightforward strategy for implementing dynamic checks, but certain issues do exist. One in particular is a rewritten program no longer uses the same code memory and all memory addresses in the program must be adjusted accordingly. However, there are available tools to mitigate some of these issues.

CFI instrumentation modifies each source instruction and each possible destination instruction of computed control-flow transfers. Two destinations are equivalent when the CFG contains edges to each of the same set of sources. For example, if the CFG contains edges to two destinations from a common source, then the destinations are equivalent. At each destination, the CFI instrumentation inserts a bit pattern, or ID, that identifies an equivalent class of destinations. The CFI instrumentation also inserts a dynamic check, or ID-check, before each source that ensures the runtime destination has the ID of the proper equivalent class. CFI instrumentation uses specific machine-code sequences for ID-checks and IDs.

As part of CFI enforcement, there is a measurement of the overhead required for the CFI instrumentation. Typically, the size of the binary after CFG construction and CFI implementation increased on average by 8%. This overhead is viewed as an increase in runtime.

FIG. 1, generally at 100, shows a representative drawing of CFI enforcement overhead for a number of benchmarks. Benchmarks 102 are common Standard Performance Evaluation Corporation 2000 ("SPEC") computation benchmarks. As shown, the normalized overhead 104 for CFI enforcement increases the running time for each CFI-instrumented benchmark at 102 relative to the runtime of the original benchmark binaries. On average, shown at AVG 106, the benchmarks took approximately 16% longer to execute with the measured overhead ranging from 0 to 45%. This overhead results from a number of factors, including increased cache pressure.

CFI provides strong guarantees that the control flow of a running program does not deviate from its CFG. If the CFG is a perfect representation of the control flow of a binary, then it will be difficult for an attacker to get arbitrary code execution. However, enforcing an arbitrary CFG can have serious overhead implications and it can be very difficult to generate a CFG that is a perfect representation of a binary.

Conventional systems, as described above, necessitate that the structure of the identification labels requires a rigorous implementation process that generally renders widespread or commercial application unfeasible. This is based on the need to attach a unique identifier to each call-destination and return-destination pairing, and restrict the range of valid indirect call flow transfer targets from a call or return instruction to a single destination specifically paired to that origin. Such a system provides some security but also entails the development and insertion of unique identifiers for every individual transfer pairing in the program's control flow architecture.

To generate a control flow protection scheme of that degree, it relies on a number of assumptions that in reality are impractical. The first assumption is the process presumes the development of, and access to, a CFG of the program to be shielded by the CFI protections. The second assumption is the instrumentation framework could be constructed because there was full knowledge of the code symbols indicating the locations of indirect transfers and returns. And, the third assumption is the instrumentation would be designed for potential application only to programs that incorporate its protections before the code is compiled and, as such, there could be strong familiarity with the knowledge of the code.

There are other systems that provide methods to prevent hijacking of software programs. One such system restricts indirect control flow transfers by routing all transfers through an intermediary springboard system. Therefore, rather than allowing indirect transfers to occur, the system generates an interceding switchboard code to which any attempted indirect transfers are redirected in a manner that effectively transforms indirect transfers into direct transfers to the intermediary target rather than to the target of the code. At the springboard, a fabricated transfer is executed that serves as the indirect transfer, and then a direct transfer from the springboard location to the intended target of the original direct transfer occurs. Any indirect transfers are thus contained within the intermediary springboard. This method has some effectiveness but it also adds a larger level of complexity to the handling of indirect transfers.

Another method sorts transfer targets and origins into various predetermined categories. Indirect transfers are subsequently restricted from certain classifications of origins to a limited set of target categories based on the origin's classification. This method relies on a control flow map produced using a linear recursive mapping process. Any indirect transfer in the system is permitted only if it is proposed target is within the group of target classifications with which the transfer's origin point is paired. Again, this system adds undue complexity to the handling of transfers and also restricts these transfers to a finite subset, which may not be desirable.

Yet another protection system generates instrumented code only immediately prior to runtime. This system relies on access to assembly/disassembly methods for that process. Although, the system may have certain efficacy, it does not provide significant advantages over other conventional systems.

The present invention is able to solve the problems of conventional systems to provide a system that requires less average overhead and does not require all of the complications of the other systems described above yet it provides an improved CFI system and method that may be implemented more effectively.

SUMMARY OF THE INVENTION

The present invention is an improved CFI system and method that provides security from attacks that may result in the hijacking of computer software. According to the improved CFI system and method of the present invention, the CFI instrumentation inserts two tags to effect label identification. The first tag is positioned before any instruction that would result in an indirect control flow transfer and requires the program to execute a check. The second tag is located before the first line of any legitimate transfer destination and when discovered by the tag check allows a program to carry out the indirect transfer. This tag orientation does not prevent transfers to targets other than the origin instruction's specific intended destination but rather limits transfers to only those destinations that begin with the proper label dedication. Although, an incorrect address may be called that will be within the software program's assortment of legitimate indirect transfer targets, and any attempts to exploit or reroute indirect transfers outside of the established control flow are eliminated.

The improved CFI system and method may be implemented on a computing system that includes processors, system memory, input/output ("I/O") structures, a user interface, and connections between these components. The improved system may also be connected to one or more servers for carry out one or more steps of the method of the present invention.

The improved CFI system and method the present invention does not require the generation of a CFG. Further, it does not rely on any prior knowledge of identifying symbols within the software code. Further, the CFI system and method of the present invention may be executed via a compiler, runtime binary instrumentation, or via static binary rewriting.

According to the improved CFI system and method of the present invention, there may be binary CFI that is based on a white-list of legitimate transfer targets located within a software program's code. The instrumentation does not require a springboard nor does it operate based on categories or classifications. A control flow map is generated with recursive-to-linear code analysis and the proper indirect transfer locations are then catalogued in a white-list.exp file. If there are any attempts to effect indirect control transfer, such a transfer is cross-referenced against the .exp file to determine if the target is valid.

At least some of benefits of the improved CFI system and method overcome many of the existing limitations of conventional protection systems. For example, the present invention includes novel methods for the modification of, loading of, and execution of modified binaries for operating systems, such as Microsoft's Windows operating system. "Microsoft" and "Windows" are registered trademarks of the Microsoft Corporation. Specifically, for example, with respect to the Windows operating system, the method of the present invention permits static binary rewriting of Windows portable executable ("PE") files, their libraries, and required Windows system DLLs on 32-bit and 64-bit platforms. The system and method of present invention are capable of applying its rewriting structures to 32-bit and 64-bit applications. The system and method of present invention are also capable of applying any closed-form binary modification structure to Windows PE files, their libraries, and required Windows system DLLs, to include randomization, instruction substitution, and CFI. By making use of the Windows exception handler, the present system and method of invention are capable of resolving more potential failure scenarios, while maintaining system correctness and limiting system overhead.

The improved CFI system and method of present invention, by way of example, modifies the loading structure for Windows PE binaries, libraries, and Windows DLLs, by making use of the Image File Execution Options folder of the Windows registry to streamline the deployment and rewriting processes. The system uses a cache for rewritten binaries, allowing for the inclusion of Windows DLLs, as well as third-party DLLs, allowing for rapid application loading, management of binary-level updates, and rapid removal of the binary rewriting. The modified binary file structure according to the improved CFI system and method of present invention provides for high-confidence, robust resolution of the intermingling of data and code in Windows PE files, without adding a large amount of overhead. The system and method of present invention also robustly integrates with binary code that cannot be rewritten, such as, JIT'd code, obfuscated code, and .NET.

The improved CFI system and method of the present invention will now be described in greater detail in the remainder of the specification referring to the drawings.

BRIEF DESCRIPTION OF THE DRAWINGS

FIG. 6 shows a representative flow diagram associated with an alternative embodiment of the improved CFI system and method of the present invention.

FIG. 7 shows a representative flow diagram of the method by which the improved CFI system redirects the process from the target program, Program.exe, to the launcher program, Launcher.exe, and carry out the initialization of Launcher.exe.

FIG. 8 shows a representative binary Program.exe and linked libraries (*.dll) that includes a modified entry point, Native code and data, and appended rewritten code and hash table according to the improved CFI system and method present invention.

FIG. 9 shows a representative flow diagram of the method by which the improved CFI system launches the protected target program, protected Program.exe.

DETAILED DESCRIPTION OF THE INVENTION

The present invention is an improved CFI system and method that provides security from attacks that may result in hijacking of computer software. According to at least a one embodiment of the improved CFI system and method of the present invention, CFI instrumentation inserts two tags to execute label identification. The first tag is positioned before any instruction that would result in an indirect control flow transfer and requires the program to execute a check. The second tag is located before the first line of any legitimate transfer destination and when discovered by the tag check allows a program to carry out the indirect transfer. This tag orientation does not prevent transfers to targets other than the origin instruction's specific intended destination but rather limits transfers to only those destinations that begin with the proper label dedication. Although, an incorrect address may be called that will be within the software program's assortment of legitimate indirect transfer targets, and any attempts to exploit or reroute indirect transfers outside of the established control flow are eliminated.

According to the improved CFI system and method of the present invention, there is binary control flow integrity that is based on a white-list of legitimate transfer targets located within a software program's code. The instrumentation of this embodiment does not require a springboard nor does it operate based on categories or classifications. A control flow map is generated with recursive-to-linear code analysis and the proper indirect transfer locations are then catalogued in a white-list.exp file. If there are any attempts to effect indirect control transfer, such transfers are cross-referenced against the .exp file to determine if the targets are valid.

To understand the implementation of the improved CFI system and method of the present invention, it is first necessary to understand binary load process for a typical operating system, such as, for example the Microsoft's Windows operating system. Although, the binary load process is being described with respect to the Windows operating system, it would be understood by a person of order a skilled the art that this would apply to other operating systems as well.

In describing the normal method for loading a binary in Windows, it is understood that the system on which it is loaded is a computer-based system, such as a laptop computer, workstation, desktop computer, other similar type devices that include one or more processors, system memory, integral or connected input devices, an associated display screen, I/O systems as well bus connections for connecting the processors, system memory, and I/O systems, and firmware and software for the operation of the computer system. It is further understood that a processor also may have local memory associated with it.

Figure 1:
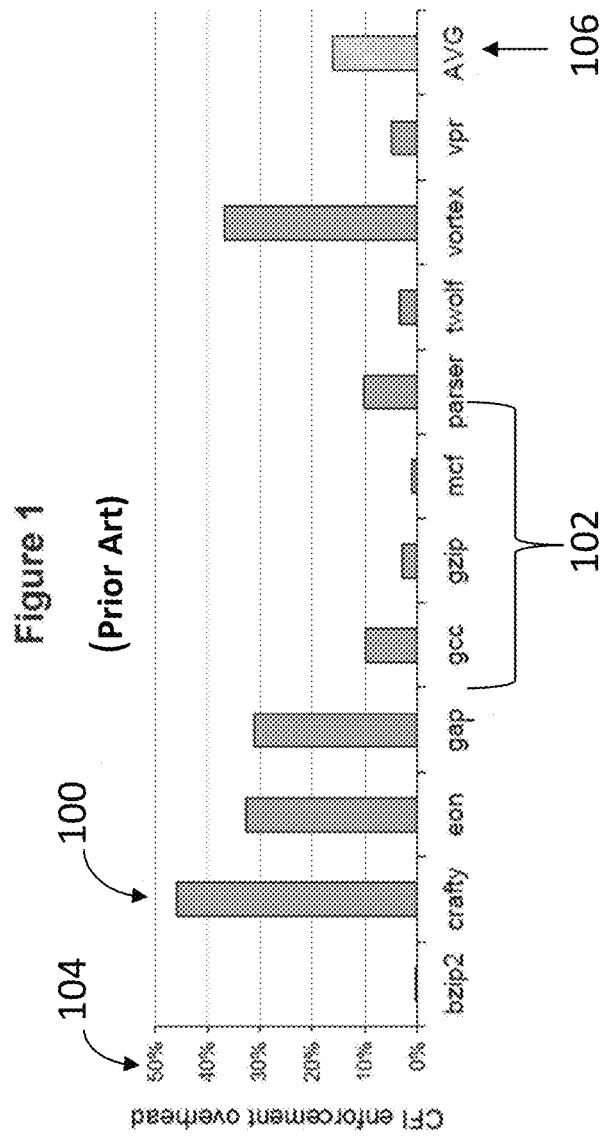
FIG. 1 (prior art) shows a representative drawing of CFI enforcement overhead with respect to series of SPEC benchmarks.
Figure 2:
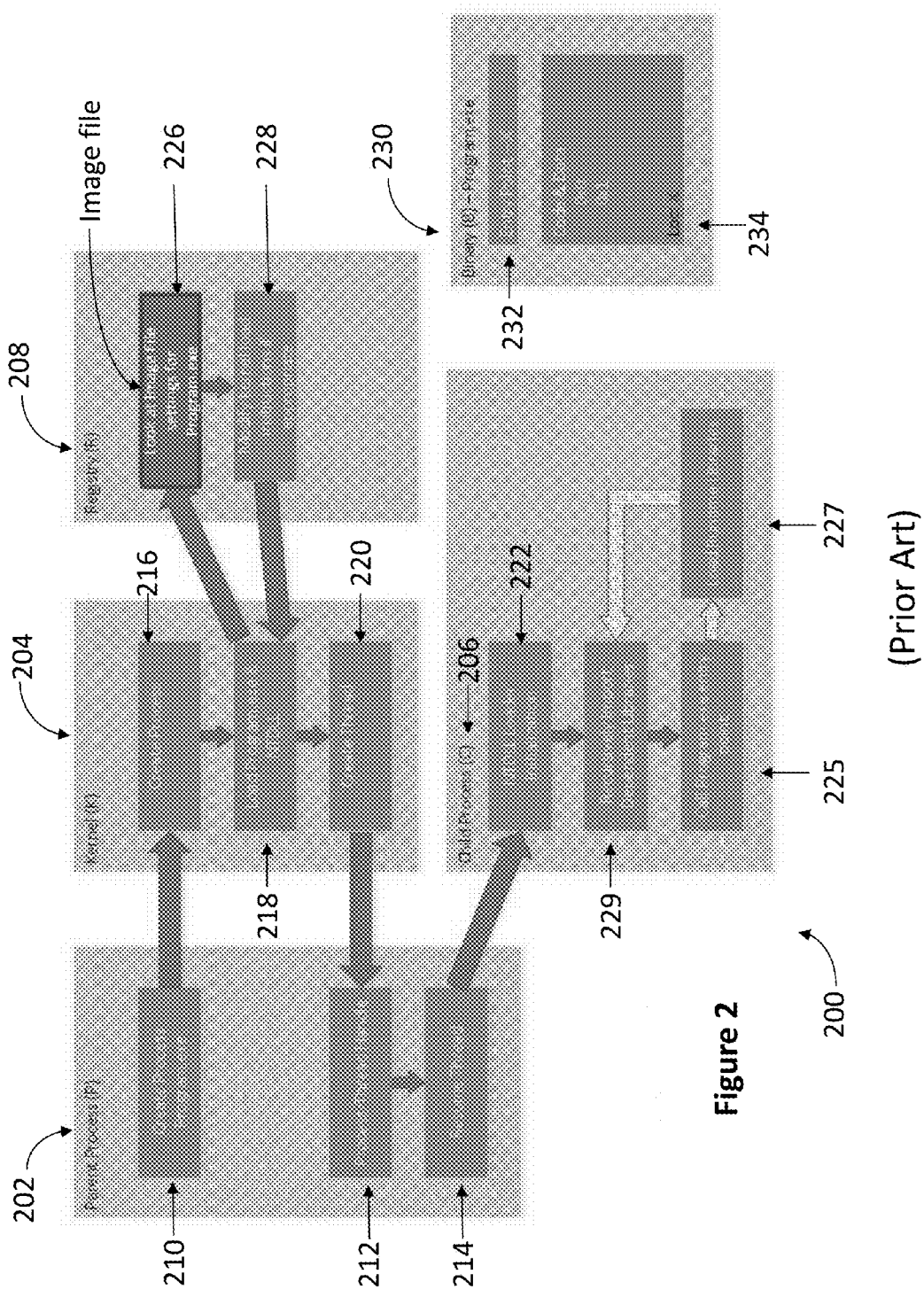
FIG. 2 (prior art) shows a representative conventional binary load process for an operating system.

FIG. 2, generally at 200, shows a representative diagram for a normal binary load process. This process includes four components for establishing the running of a new program, e.g., in the Windows operating system. These components include parent process 202, kernel 204, child process 206, and registry 208. Parent process 202, which creates one or more child processes, requests the operating system to load a target program. The target program may be loaded from the command line, "cmd.exe." The target program also may be loaded from a graphical user interface ("GUI"), "explorer.exe."

Kernel 204 is the core of the operating system. The kernel manages all the hardware, I/O, displays, storage, and other systems of a computer. For purposes of the present invention, kernel 204 has the responsibility for allocating resources, e.g., memory, requested by the parent process and initializing the operating environment for each child process.

Child process 206, which is created by parent process 202, is a target program that is to be loaded and run. For purposes of the present invention, the child process is the application being protected by the improved CFI system and method of the present invention. With respect to the description of the present invention, a program run by the child process will be referred to as "Program.exe." Further, the term "Program.exe" for purposes of describing the present invention is meant to refer to any binary, e.g.,*.exe,*.com, and*.dll.

Preferably, registry 208 is a registry that has a file-based data-structure. The registry contains settings for the operating system and applications. For binaries on a computer, the registry contains settings that control the start-up instructions for any given binary.

Again referring to FIG. 2, the normal process for loading a binary, which in this case is a child program (Program.exe), on a computer will be described. The normal process being referred to is provided is only for the purposes of showing a system upon which the improved CFI system of the present invention may be layered. After there is an understanding of the normal binary loading process, the improved CFI system and method of the present invention that is layered on the normal binary loading process will be described.

Referring to FIG. 2 at 210, the current parent process (parent program) 202 packages a request to send to kernel 204 to launch child process (target program), Program.exe. At process step 216 of kernel 204, the kernel receives the request to create of Program.exe. The kernel will perform implementation specific steps to verify that the request is allowed and the appropriate resources exist to create Program.exe. If the request is permitted, the kernel moves the request to process step 218. If the request not permitted, the request is denied and the process terminates.

Process step 218 queries appropriate information about the settings for Program.exe from registry 208. At process step 226 of registry 208, the image file settings of Program.exe are looked up based on the process name, in this case Program.exe. If the settings specify an alternative program to load, then the kernel load instructions are modified at process step 228. If the review reveals that there is no need for any modification to kernel load instructions, then information as to this condition is queued at process step 228 for transmission to process step 218 of kernel 204.

When the registry transmits instructions from process step 228 of registry 208 to process step 218 of kernel 204 and there is a need to modify the kernel instructions, the kernel load process will be adjusted accordingly. These registry instructions may include for example start-up flags or load a debugger. If, on the other hand, the transmission from process step 228 of registry 208 to process step 218 of kernel 204 contains no modification instructions, the kernel loading process will continue without modification.

Again referring to process step 218 of kernel 204, after the instructions have been received from process step 228 of registry 208 and implemented, the kernel copies Program.exe, Native code/data, and NTDLL from on disk locations into running memory. For purposes of describing the present invention, NTDLL contains a number of user-mode functions, such as call stubs and the runtime library code, collectively known as "Native API."

After processing at process step 218 of kernel 204 is completed, the process moves to process step 220 where a thread is created for the new process. With respect to the thread created at process step 220, it means the kernel resource, which corresponds to the execution state of the child process 206, will start executing at process step 222. The identifier of the process and the thread that is created is transmitted to step 212 of parent process 202 where these are stored in memory by the parent process. The process continues to process step 214 of parent process 202 where the thread from process step 220 is resumed, which means the kernel will schedule the thread to execute at some point in the future.

Process step 222 of the child process 206 begins once the kernel schedules the thread to execute, which cannot happen until the thread has been resumed at process step 214. At process step 222, there is NTDLL loader initialization. At this step, the child process specific initialization functions inside the NTDLL are executed and there is initialization of the data structures. For example, the functions that may be executed include the dynamic loader initializer and the data structures that may be initialized include the thread information block. Further, the process for loading dependent libraries begins.

Once the process activities at process step 222 are completed, the child process moves to process step 224 where dependent libraries are recursively imported to the child process. These libraries are received from the import tables stored in Program.exe and every loaded library. Following the import of dependent libraries, the child process is transmitted to process step 225. At process step 225, the Program.exe entry point is called. The entry point is a location that represents the beginning of the code for execution. In the Windows context, the file to be called would be in the PE file. The child process will begin to serially execute the instructions located at the entry point.

The binary to be executed is shown at 230 of FIG. 2. The entry point for the binary Program.exe is shown at 232. The Native code and data for Program.exe are shown at 234 and it is located at "Loc. X" in an appropriate memory.

As shown at process step 225, there is a connection between it and load runtime libraries process step 227. At times during execution of the child program, additional libraries are referenced and loaded. This may be occur for several reasons, such as delayed imports or calls to functions, such as LoadLibrary. When that is the case, execution is paused at some "Instruction I" so the new library can be loaded from process step 227 to process step 225. The loading process is the same as before, and any dependent libraries are recursively loaded. Then, execution is transferred to the appropriate point in the library that has just been loaded, and when finished returns back to instruction I.

Figure 3:
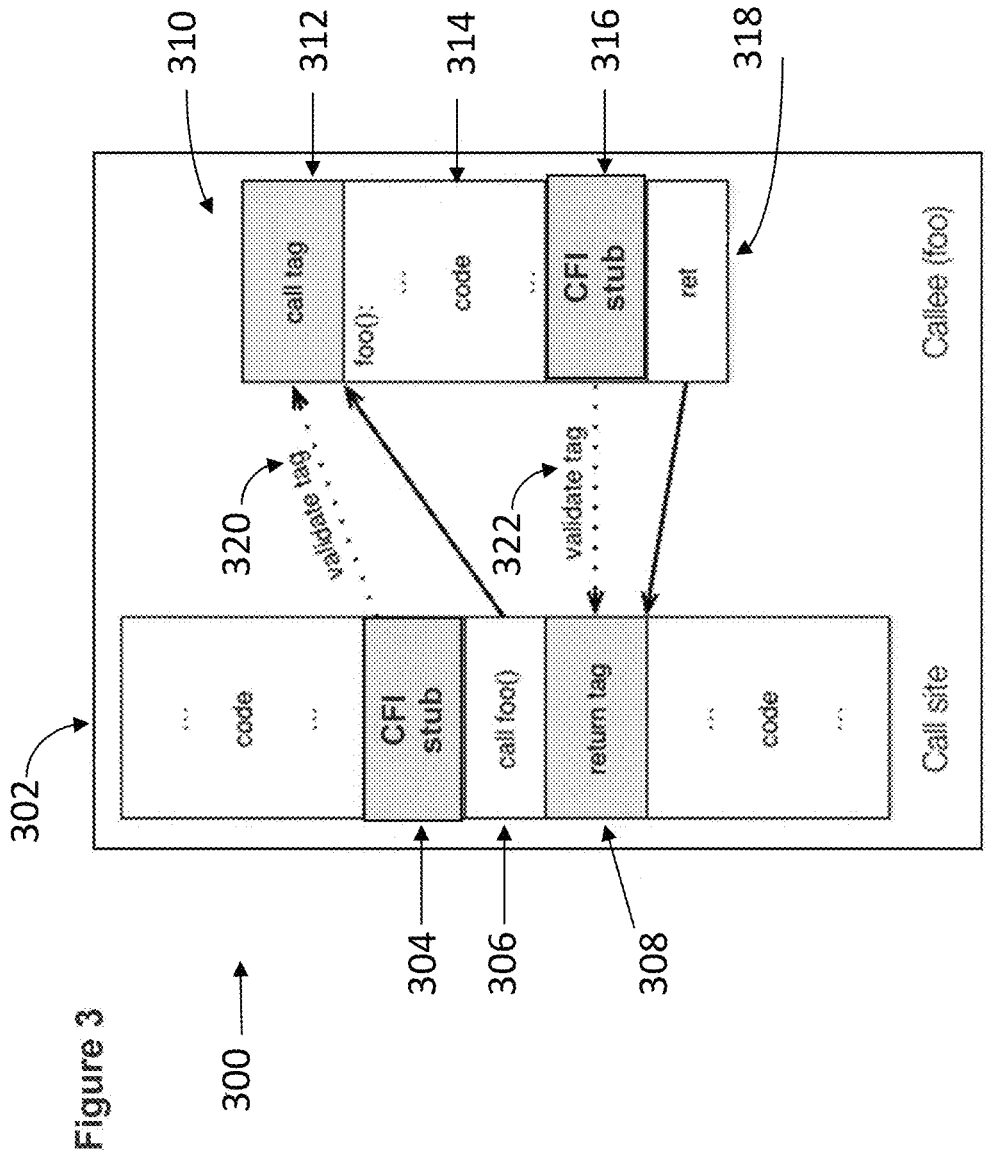
FIG. 3 shows a representative block drawing of the CFI system of the present invention.

Referring to FIG. 3, a general overview of the CFI system of the present invention is shown generally at 300. According to FIG. 3, a binary code 302, the Call Site, has CFI stub 304 inserted in it before indirect control transfer "call foo ( )" 306. CFI stub 304 will include a validation tag that will be compared with the call tag at 312 of Callee (foo) 310. The validation tag comparison that takes place at 320 between the CFI stub tag and the call tag at 312 must provide a match or indirect control transfer will not be regarded as legitimate. If the validation proves positive, call foo( ) 306 will transfer control to the code at address foo( ) shown at 314. The code at 310 has CFI stub 316 inserted before return instruction 318. CFI stub 316 also includes a CFI stub tag. At 322, the CFI stub 316 is compared to return tag 308 of binary code 302. If the two tags match, then it is considered a legitimate site to return control to binary code 302. If the tags did not match, then the return will not be permitted because it will not be viewed as a legitimate site.

Figure 4:
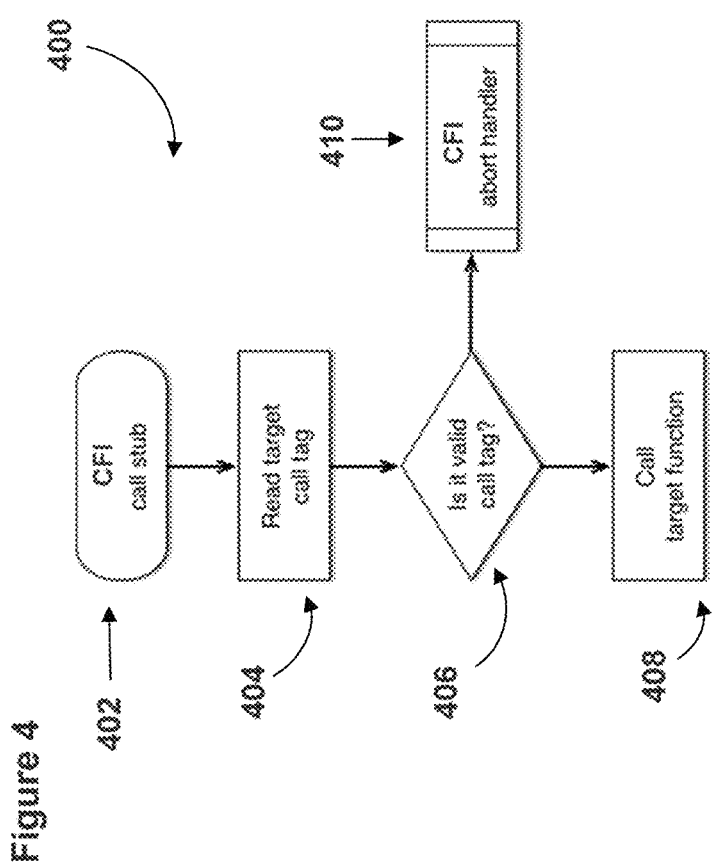
FIG. 4 shows a representative flow diagram for indirect call control transfers shown in FIG. 3.

Referring to FIGS. 4, generally at 400, and 5, generally at 500, flow diagrams are shown for the indirect call control transfers and returns, respectively, that have been discussed with respect to FIG. 3. Referring first to FIG. 4, at 402, the CFI call stub will include a tag. At 404, the target program's call tag is read. The decision block at 406 determines whether there is a match of the tags. If there is a match, there is a valid tag at the Callee program and the process will proceed to 408 and the target function will be called. If there is not a match at decision block 406, the process will proceed to the CFI abort handler 410 because the indirect transfer will not be viewed as legitimate and the call will not take place.

Figure 5:
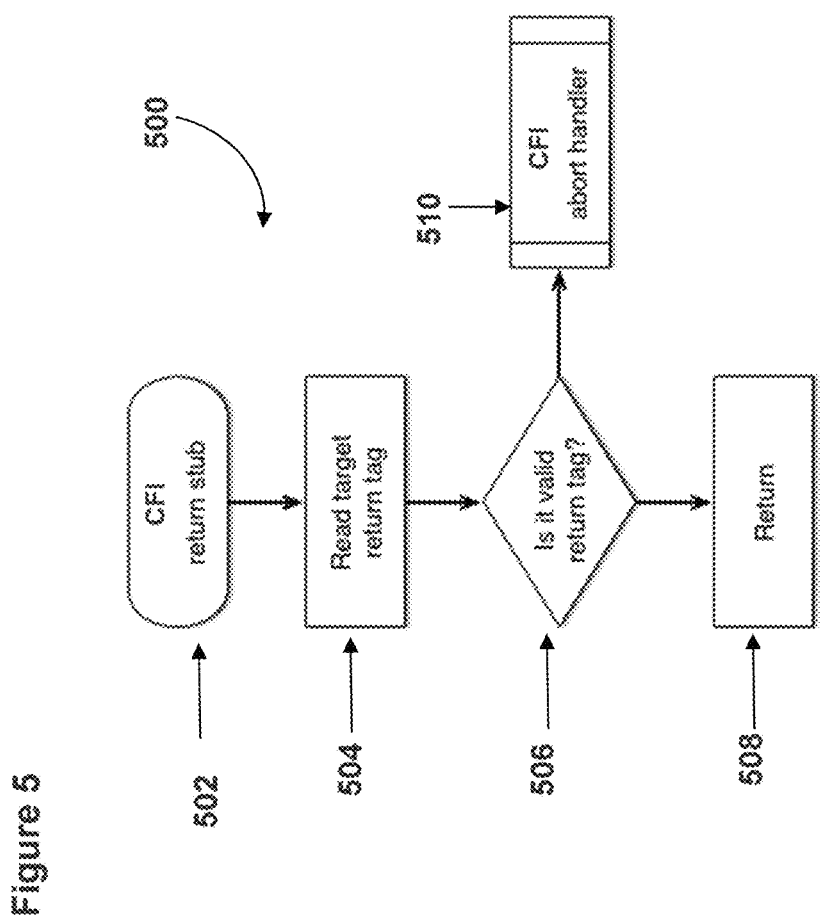
FIG. 5 shows a representative flow diagram for return control transfers shown in FIG. 3.

Referring to FIG. 5, CFI return stub at 502 of the called program will have a tag associated with it. At 504, the return tag of binary code will be read so that it can be compared with the tag of the CFI return stub. At decision block 506, a comparison is made between the two tags and if they match, the return will be considered legitimate and the process will pass to 508 where control is passed back to the original binary code. If there is not a match at decision block 506, then the return will not be considered legitimate and the process is passed to CFI abort handler 510 and the return will not take place.

The version of the improved CFI system and method of the present invention that has just been described demonstrates that there is security on both sides of the indirect control transfer without the need for the creation of a CFG.

The preceding description of the improved CFI system and method of the present invention has primarily relied on binary analysis and rewriting on to achieve CFI. The present invention may also be implemented using compiler modification to achieve CFI. This alternative method provides an effective and low overhead solution, but it is not directed to platforms that mainly use proprietary software which would be handled by the previously described embodiment.

The improved CFI system and method of the present invention, preferably uses static analysis to identify functions and dynamic analysis to instrument the call and return instructions in situations where the source code is not available. As described previously, the improved CFI system and method enforced using (1) a call instruction to redirect control flow to a function and (2) a return instruction control flow to the call instruction. To perform the same functions, this alternative embodiment of the improved CFI system and method of the present invention, it preferably uses a static analysis tool that recognizes functions and returnable locations, and outputs them to an ".exp" file. Preferably, this file is used by dynamic instrumentation code to determine the indirect transfers that should be allowed at runtime.

The static tool uses several heuristics to form the needed functions, which include, but are not limited to, recursive descent disassembly, linear sweep, procedure/return code sequences, dynamic symbols, and PIC code sequences. For purposes of illustration, the recursive descent disassembly will be described with respect to FIG. 6.

FIG. 6, generally at 600, describes another alternative embodiment of the improved CFI system and method of the present invention for systems using an Executable and Linkable Format ("ELF") (e.g., Linux, UNIX). Starting at process step 602, the system performs a recursive descent disassembly. The first instruction analyzed is at process step 604, the program entry point.

For purposes of the present invention, recursive disassembly means that from the program entry point, all referenced control flow jumps are placed on the stack to be disassembled. As each of those jumps are explored, all control flow transfers in each section of code are also placed on the stack to be explored. This function for purpose of the present invention includes identification of all code sections in the ELF file. This is followed by process step 606 where control flow instructions find more code. The code that is being searched for includes all of the control flow targets identified.

The next step in the process is at 608 where there is a linear sweep of all the code in the binary to find any code that was missed during the recursive descent disassembly. During the recursive descent disassembly process and the linear sweep process, there is identification of cross-references, e.g., Program A calls Program B; functions, e.g., Program A calls Program B, so Program B is probably a function; Position Independent Code ("PIC"), which are related function calls; and call site locations.

After the linear sweep at process step 608, there are also searches at process step 610 for references in the code section that may be function pointers or indicators of a function. More specifically, this includes finding all possible pointers in the code section and verifying that each points to valid code. Finally, at process step 612, there are searches for common prologues, nop paddings, sweeps of the .plt section, and locating dynamic symbols to find more functions. This latter searching specifically includes iterating over the entire code section for the instruction sequence: push % ebp; mov % ebp, % esp, as well as several nop instructions followed by code that is indicative of padding preceding a function.

The accuracy of the static analysis tool determines the number of false-positives during runtime.

The improved CFI system and method will now be described in view of FIGS. 7, 8, 9, and 10.

The CFI system and method of the present invention is intended to provide an execution framework for static binary modifications and execution of binary code, for example, Windows binary code. Although, the description of the binary code used in the exemplary embodiment of the present invention is Windows binary code, it would be understood by a person order skill the art that the binary code associated with other operating systems could be used and it would still be within the scope of the present invention.

The present invention has the capability to use a variety of binary modification algorithms, including basic block randomization, instruction substitution, and course-grained control flow integrity. For purposes of the improved CFI system and method of the present invention, "binary modification" means reordering the assembly instructions as part of an operating system executable, such as for the Windows operating system. The binary modifications are applied for the purpose of preventing hackers from exploiting vulnerabilities in the binary.

The system and method of the present invention is capable of, prior to code execution, operating dynamically at runtime or statically by hooking pointers to memory locations of instrumented code. The system of the present invention operates the instrumented code using a separate table, distinct from the structure of certain linkages by using a server to generate hooks and instrumented code. The rewriter of the present invention needs only to be executed once to enable all clients to query the server for the proper block sequence. The rewritten binaries, created by the system of the present invention, may be exported to any program clients that query the server on which the static binary rewriter of the present invention has been implemented. Each client will be able to receive individual randomization of code blocks.

The improved CFI system and method of the present invention is layered upon the normal binary execution process to modify it to provide protections across the target binary e.g., Program.exe, and its supporting libraries. Preferably, the improved CFI system and method includes at least three elements. These are the binary modification element, modified binary launching element, and binary execution and failure cause analysis element.

The binary modification element leverages any one of a series of closed-form modifications to the assembly code of executables and their associated libraries. For purposes of the present invention, "closed-form" means that modifications do not make changes to a programs behavior in legitimate scenarios. The modifications according to the binary modification element may be applied in a cloud-based manner or on a local system. Further, according to the modification element, the system of the present invention will reprocess or re-modify a binary or its dependent libraries if the system detects changes in the source binaries. This will ensure that there is always consistency and integrity between binary versions. It is understood that other closed-form algorithms may be used and it would still be within the scope of the present invention.

The modified binary launching element is directed to a binary containing location information for all the elements of execution. With respect to the Windows operating system, the binary is a PE file. According to this element, when the order of the binary and dependent library elements is modified, the way in which they are loaded is also modified. If this loading modification is not done correctly, the modified binary will try to access relocated functions in an original, unmodified library, causing an exception. Further, if the dependent libraries are not modified, hackers can simply attack vulnerable code in the libraries, rendering inert the protections of the improved CFI system of the present invention. The present invention incorporates modifications of one core library, NTDLL, which is loaded in all processes and is responsible for loading other libraries. These modifications permit the improved CFI system of the present invention to load the appropriate modified libraries and correctly handle requests to and from the kernel.

The binary execution of false cause analysis element tracks the status of running programs to determine why and when each terminates. This element also includes a vectorized error handler associated with the running binaries that help separate failure states that are a side-effect of the modification element versus failure states that are a result of an attempted compromise (attack).

According to the improved CFI system and method of the present invention, at least the following components are inserted into a binary execution process for the purpose of modifying it to increase the security of the binary code from control flow attacks. These components will be described, and then it will be shown where they are inserted in the binary execution process in FIGS. 7, 8, and 9. Preferably, the components are injected by the reordering of pointers.

The system and method of the present invention add a Launcher.exe file that oversees the modified execution of Program.exe. The functions of Launcher.exe include modifying the library loading paths, which ensures the protections flow down to other deliverables, initializing key memory structures, such as the memory bitmap (see FIG. 11) used during program execution, and listening for faults. Launcher.exe is added as part of the binary launching process described as will be described with respect to FIG. 7. For purposes of the present invention, Launcher.exe is preferably considered a debugger.

A NTDLL' file is added to the binary execution process. A NTDLL file is a key data link library ("DLL") that exports the Native APIs, e.g., Windows APIs. According to the present invention, the NTDLL' file is a version of the NTDLL file that is rewritten by the same binary rewriting algorithm that rewrites Program.exe.

The Helper.dll and Helper.dll' files are also added. The Helper.dll file is a library that includes the functions necessary to supplement the library loading process. Helper.dll is used because there may be cases when the NTDLL may be too sensitive to handle extreme changes. Including Helper.dll permits highly specific functions in NTDLL to be redirected to Helper.dll', without interrupting basic kernel-level responsibilities. The Helper.dll' file is a rewritten version of the Helper.dll file. Helper.dll' is loaded at process step 916 in FIG. 9.

Figure 11:
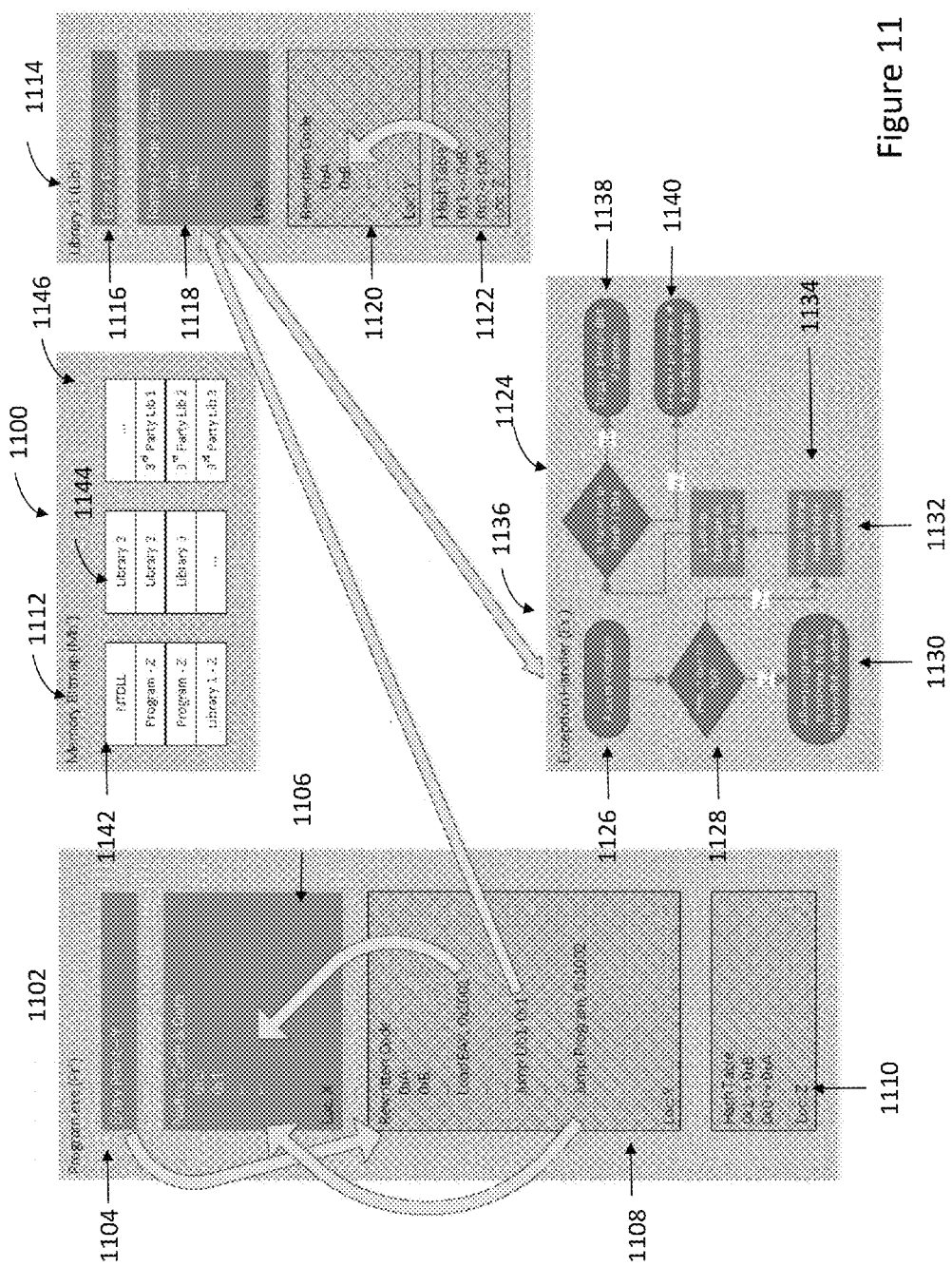
FIG. 11 shows a representative flow diagram of the modifications the CFI system and method of the present invention makes to the normal binary execution process.

A memory bitmap is also added. The memory bitmap is a runtime data structure that provides a resolution mechanism for the location of remapped code. Only libraries that have been rewritten by algorithms according to the system and method the present invention will be added to the memory bitmap. For each loaded library, entries are made in the memory bitmap that point to the hash table location for the library itself For example, code offset Z would point to the beginning of the Program.exe hash table. As such, for each page of memory associated with Program.exe, a lookup is created for the memory bitmap. The memory bitmap is shown in FIG. 11 at 1112.

The CFI system and method includes a vectorized exception handler in the execution process for binary code loaded at process step 934 in FIG. 9. The decision logic of the vectorized exception handler is shown in process step 1124 in FIG. 11. This exception handler becomes a legitimate part of the binary execution process for protected code. The present invention loads the vectorized exception handler for constructing scenarios that generate memory access violations and still maintain control of the binary execution in such scenarios.

Figure 10:
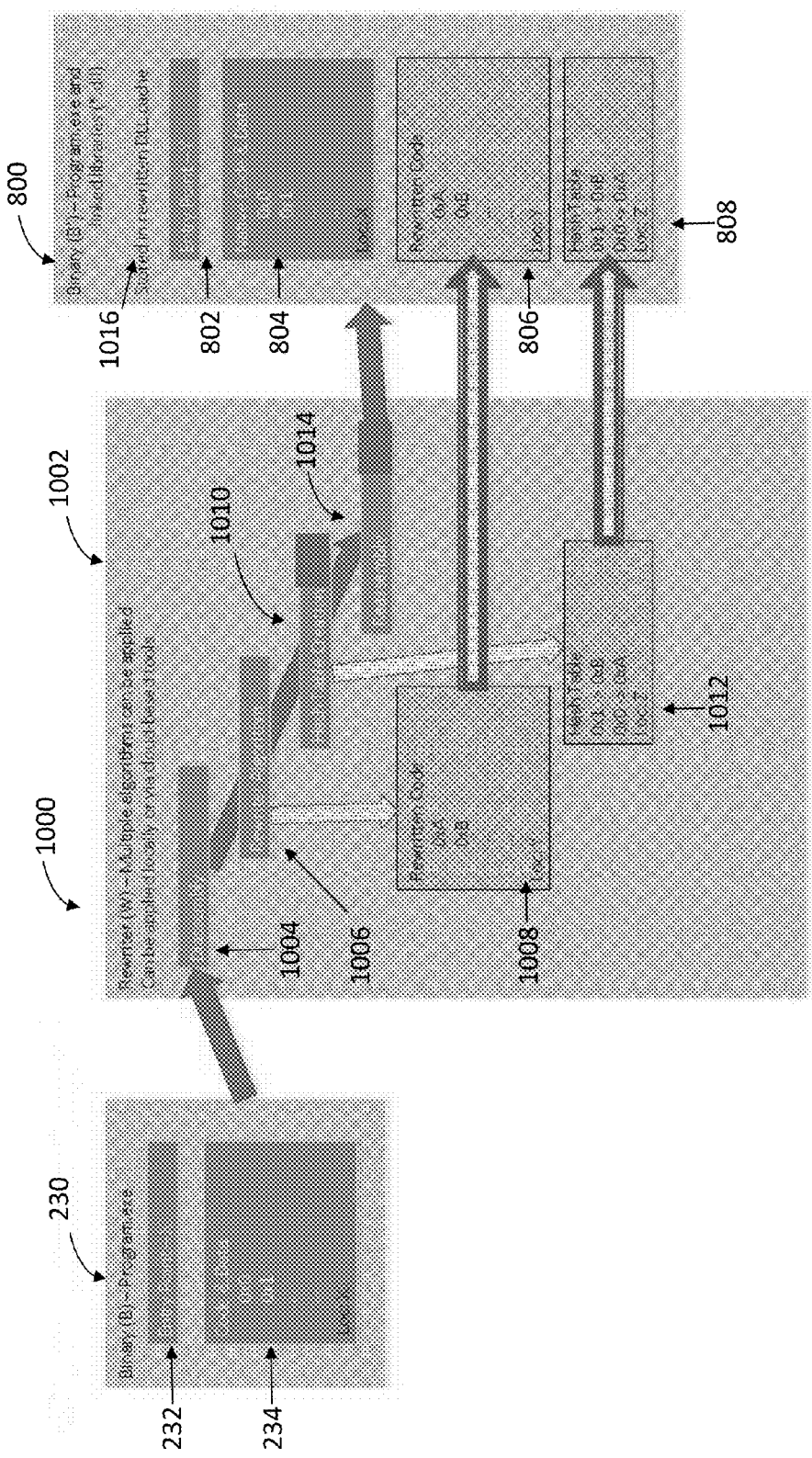
FIG. 10 shows a representative flow diagram for the method by which Native code is rewritten during the improved CFI system and method of the present invention.

A component of the binary execution process that is also included is a rewritten code section (FIG. 10 at 1008). The rewritten code section is functionally equivalent to the Native code section at 234 in FIG. 2. The rewritten code section uses the principle of "software polymorphism." That is, the same algorithm can take many shapes. For example, 1+3 has the same outcome as 6−2, but the resulting instructions would look different. The rewriting is performed according to FIG. 10. This transformation includes all of the executable code, which includes all Native code, but not the data, that form the binary code. The transformed code will include all of the functionality that existed in the Native code before the transformation.

A hash table is an added component to the binary execution process. The hash table is a static structure that is appended to the end of the modified (rewritten) binary code. The hash table will contain pointers from the Native code section of the binary code to the code's logically equivalent section of the rewritten code.

The last component is the rewritten DLL cache. According to improved system and method of the present invention, when libraries or executables are rewritten locally, they are stored in this DLL cache. Preferably, this DLL cache is in the form of a folder that is locally accessible. The DLL cache permits faster loading of the rewritten binary code. If protected binary code has been updated since the last execution of the protected program, the cached copy of the rewritten binary code will be deleted and a new version of the library, prepared by the rewriter of the system of the present invention, will replace it that was built from the last version of the library.

Now having described the components the improved CFI system and method add to the binary execution process, the novel execution process will be described that includes them.

The improved CFI system and method of the present invention modifies the start-up process for binary execution primarily in two ways. These are that binary execution is redirected from the target program, Program.exe, to a launcher program of the improved CFI system, named Launcher.exe. Then, the launcher program, Launcher.exe, loads Program.exe as a child program. The result of this is that Launcher modifies the process of Program.exe, preparing it to utilize the improved CFI protections before Program.exe begins running Launcher.exe gives the improved CFI system and method a mechanism to run protected versions of NTDLL and referenced libraries, referring to FIG. 9 at process steps 914, 916, 934, and 938. Each of the aforementioned process steps occur before the entry point for Program.exe is called. Without Launcher.exe, it would not be possible to guarantee that protected library versions were loaded, before non-rewritten function pointers and return all addresses were used in initialization.

Referring to FIG. 7, generally at 700, the method by which the improved CFI system redirects the process from the target program, Program.exe, to the launcher program, Launcher.exe, will be described. More specifically, FIG. 7 shows the initialization of the Launcher.exe program. This description of the initialization process will also reference the normal process that is shown in FIGS. 2, upon which the present invention is layered, and its associated description.

Referring to FIGS. 2 and 7, the first change to the normal binary execution process is at 226 in registry 208. In the normal binary execution process at 226, the settings of Program.exe are reviewed. In FIG. 7 at 702, Launcher.exe replaces Program.exe. As such, the image file lookup at 226 has been modified so that it points to Launcher.exe as a debugger as shown at 702.

The next revision to the normal a binary execution process is that as a result of replacing the image file settings lookup at 226 for Program.exe with Launcher.exe at 702, the return path will include Launcher.exe, as shown at 704, with command line parameters that indicate Launcher.exe should start/debug Program.exe.

Following the change at 704, the step at 218, which was to load Program.exe and NTDLL, is replaced with step 706, which will load Launcher.exe and the native NTDLL. Launcher.exe becomes a debugger for Program.exe. By becoming a debugger for Program.exe, Launcher.exe is able to arbitrarily modify the application memory of Program.exe.

Again referring to FIG. 7, the Launcher.exe program is processed at process step 220 to create a thread in kernel 204. At step 212, the output of step 220, the thread and process identifier, are received by the parent process and stored in an appropriate memory by the parent process. The process continues to process step 214 where the thread from process step 220 is resumed, which means that the kernel will schedule the thread to execute at some point in the future.

According to FIG. 7, process step 222 of the child process 206 begins to execute the Launcher.exe once the kernel schedules the thread to execute, which cannot happen until the thread has been resumed at process step 214. The normal initialization process continues for Launcher.exe, along the same lines as described previously for FIG. 2 for Program.exe. And, at process step 708, there is a call for the Launcher.exe entry point rather than the Program.exe entry point as is shown in FIG. 2. The method by which Launcher.exe oversees the execution of a protected version of Program.exe will be described with respect to FIG. 9. Before describing FIG. 9, the rewritten binary code will be described referring to FIG. 8.

Referring to FIG. 8, the modifications to the Program.exe and link libraries (*.dll) are shown generally at 800. Since Launcher.exe is the file being used, its entry point will be different from Program.exe. As shown at 802, this is depicted as "Entry Point-Y" for Program.exe rather than what is shown at 232 as "Entry Point-X" for Program.exe. The Native code and data at 804 in FIG. 7 is the Native code and data for Program.exe, which is shown at 234 in FIG. 2. As such, both figures indicate the same location for the Native code, which is "Loc. X." The rewriting process will be described in detail with respect to FIG. 10.

When the Program.exe and linked libraries are rewritten, the rewritten code is shown at 806. The rewritten code is appended to the end of the Native code and data at 804. Examples of the rewritten code are shown as "0xA" and "0xB." The location of the rewritten code is "Loc. Y," which is different from the location of the Native code shown at 804.

Appended to the rewritten code is hash table 808. Hash table 808 provides pointers between the Native code at 804 and the rewritten code at 806. For example, Native code 0x1 points to rewritten code 0xB and Native code 0x0 points to rewritten code 0xA. The location of the hash table is "Loc. Z."

Referring to FIG. 9, generally at 900, a representative flow diagram of the method by which the improved CFI system launches the protected target program, protected Program.exe will be described. Certain initial steps of the launching process according to FIG. 9 are substantially similar to those carried out in a normal binary execution process (see FIG. 2) except that the parent process is the Launcher.exe program as shown at 902 that was generated according to FIG. 7. At step 910 of parent process 902, Launcher.exe will initiate a modified load sequence for Program.exe. More specifically, Launcher.exe will package up a request to the kernel to launch Program.exe, setting a flag DEBUG_PROCESS. The Launcher.exe oversees the modified execution of Program.exe, which a hacker would not have access and will provide a protected environment by which to launch Program.exe. As stated, this will involve modifying the library loading paths, initializing key memory structures, and listening for faults.

The output of step 910 as input to create process step 922 of kernel 904. At step 922, kernel 904 receives a request to create of the process, with the aforementioned DEBUG_PROCESS flag set. As before, there is some initial error checking to ensure the request is permitted and that the appropriate resources exist. If the request is permitted, the kernel moves the request to process step 924. If the request not permitted, the request is denied and the program terminates.

At process step 924, the normal process of reviewing registry entries for Program.exe at 928 and 930 is ignored, as shown at 929, as shown at 928, because the DEBUG_PROCESS flag is set. If no rewritten version of Program.exe exists in the DLL cache or the version of Program.exe is more current than the rewritten version of Program.exe, the rewriter described in FIG. 10 will execute on Program.exe. The rewritten binary code for Program.exe is copied into the appropriate memory. More specifically, the Native code and data (804 of FIG. 8) at process step 924 is preferably loaded into non-executable memory. The rewritten code (806 of FIG. 8) preferably is loaded into executable memory. Hash table 808 is preferably loaded into non-executable memory.

Again referring to process step 924 of kernel 904, after Program.exe has been loaded, Windows native NTDLL is loaded from on disk locations into an appropriate memory. Again, for purposes of describing the present invention, NTDLL contains a number of user-mode functions, such as call stubs and the runtime library code, collectively known as "Native API."

After the processing at process step 924 of kernel 904, it is passed to process step 926 where a thread is created. The identifier of the process and the thread that are at process step 926 are transmitted to process step 912 of parent process 902 where these are stored in an appropriate memory by the parent process.

The results of process step 912 are transmitted to process step 914. At process step 914, if the NTDLL has changed since the last execution of Program.exe or this is the first time Program.exe has been run, the present invention will create an NTDLL', which is the NTDLL that preferably has been modified in a manner described according to FIG. 10. NTDLL' is loaded into Program.exe's application memory. The parent process, Launcher.exe, changes the Program.exe's application memory to a read/write memory and modifies the NTDLL export table and its functions so that any function call into NTDLL goes instead into NTDLL'. Additionally, function callbacks used by the kernel, such as KiUserCallbackDispatcher, for example, are redirected with hooks. Once this is completed, appropriate entries are made in the memory bitmap shown at 1112 in FIG. 11 for NTDLL', pointing to the hash table (FIG. 8 at 808) for NTDLL in application memory.

Following the processing at step 914, if the Helper.dll has changed since the last execution of the Program.exe or this is the first time Program.exe has been run, the present invention will create a Helper.dll', which is the Helper.dll that preferably has been modified in a manner as described with respect to FIG. 10. Further, Helper.dll' is preferably loaded into Program.exe's application memory. The parent process, Launcher.exe, detours certain functions of NTDLL to point to Helper.dll' A non-exhaustive list of the functions forwarded to Helper.dll' from NTDLL preferably include LdrpFindKnownDll, LdrpFindOrMapDll, NtCreateSection, and NtOpenFile. It is understood that other functions may be forwarded and it would still be within the scope of the present invention As with NTDLL', appropriate entries are made in memory bitmap for Helper.dll', which is shown in FIG. 11 at 1142.

The next step in the modified binary execution process is at 918 of the parent process, Launcher.exe, 902. At this step, the thread is resumed, which means that the kernel will schedule the thread to execute at some point in the future.

Different from the normal binary execution process, the improved CFI system and method adds the process step at 920 at which the parent program, Launcher.exe, includes a listening state to determine when Program.exe terminates. This will be described in greater detail with respect to process steps 948 and 950.

Again referring to FIG. 9, the output of process step 918 of parent process 902 is input to process step 932 of child process 908. The child process that is created is for the protected Program.exe. At step 932, the child process, application memory specific initialization functions inside the NTDLL are executed and there is initialization of the data structures. By adjusting NTDLL's export table and function pointers, the improved CFI system of the present invention has redirected those functions to point to code located in NTDLL. The result is that when the kernel is trying to execute NTDLL, it is actually initializing child process specific initialization using assembly instructions inside of NTDLL. For example, the functions that are executed include the dynamic loader initializer and the data structures that are initialized include the thread information block. Further, the process for loading dependent libraries begins.

After NTDLL' loader initialization at step 932, there is processing of the Program.exe at step 934. At this step, a vectorized exception handler is loaded. The vectorized exception handler will be searching for access violation exceptions. More specifically, the vectorized exception handler is used to insert a decision-making capability into the memory access violation process. The system and method the present invention uses these violations to provide differentiation between legitimate references to Just-in-Time Compiled ("JIT'd") code or ignored code, legitimate references to code that was incorrectly labeled as data, or malicious attempts to hijack execution.

Following step 934, where the vectorized exception handler is loaded, the process moves to process step 936 where dependent libraries are recursively imported. These libraries are imported from process step 942 from where the runtime libraries are loaded.

The next step in the process is at process step 938 where the libraries according to the system and method the present invention are loaded. NTDLL library load functions are redirected to Helper.dll' in FIG. 9 at process step 916. As a result, process step 938 of child process 908 adjusts the path of the DLL load requests, changing the path from the native DLL so it points to the cache of modified DLLs. If the modified library does not exist in the DLL cache, Helper.dll' will start the appropriate binary modification process for creating a rewritten copy of the DLL. The first query of the binary to be rewritten (DLL, etc) is to determine if the target binary, DLL, is on the ignore list. The ignore list includes a certain class of libraries that preferably are ignored and cannot be rewritten by binary modification. For example, these libraries include obfuscated binaries. If the binary is on the ignore list, typically, there will not be an attempt to modify the path to the DLL and the native DLL is loaded. Once the updated library path has been identified, the new path is to the default LoadLibrary method in NTDLL', which loans the rewritten library, now DLL'. In referring to the Load Library method, it is meant to refer to an a native function in the NTDLL library that handles the method of loading libraries into an appropriate memory.

Preferably, the sections of the rewritten binary are loaded according to the following method. First, Native code and data are loaded into non-executable memory as data, entirely without modification, referring to the Native code and data at 804 in FIG. 8. Second, the rewritten code at 806 in FIG. 8 is loaded into actual memory for the Program.exe process. Last, the hash table at 808 in FIG. 8 is loaded as data.

Preferably, for every rewritten library that is loaded, there are a series of entries made into the memory bitmap. For each page of virtual memory allocated to a library, the address of the virtual memory page is added as a lookup value in the memory bitmap at 1142, 1144, and 1146 in FIG. 11. A stored value assigned to a lookup value is the address in the hash table for the library. For example, when the library "example.dll" is loaded by a LoadLibrary instruction, it fills four pages of memory. In a notional 32-bit address space system, the 20-bit addresses of these pages may be represented by 0x009A1, 0x009A2, 0x009A3, and 0x009A4. The hash table for "example.dll" is loaded at Loc. Z in the rewritten DLL. Loc. Z is provided with an offset from the beginning of the binary, for example, 244C. As such, "example.dll" would reside at 0x009A1+Z, which for this example would be 0x009A344C. The stored value for each hash table lookup value (0x009A1, 0x009A2, 0x009A3, and 0x009A4) would be 0x009A344C.

At process step 940, there is a call for the Program.exe entry point. This will represent the beginning of the Program.exe code for execution, moving to process step 944. At this step, the Program.exe code will begin serially executing the instructions located at the entry point. The entry point for the code will be the code at location Y. This is shown at 802 in FIG. 8. The code that will be executed will be the rewritten Program.exe code at location Y. The execution of this code will be described subsequently in greater detail with respect to FIG. 10.

At times during execution additional libraries are referenced and loaded. This may be due to several reasons, such as delayed imports or calls to functions, such as LoadLibrary. When this is the case, execution is paused at some Instruction I in process step 944 so the new library can be loaded. Proceeding to process step 942, the loading process is the same as previously described, and any dependent libraries are recursively loaded. Then, execution is transferred to the appropriate point in the library that has just been loaded, and when finished returns back to Instruction I at process step 944.

If the execution of Program.exe terminates for some reason it is detected at process step 946. The notification of terminated Program.exe is transmitted to process step 948. At process step 948, there will be an analysis to determine "why" execution. There can be a number of reasons why code execution terminated and they include, but are not limited to, there was an attempt to use the code that was not intended for execution, there is an attempt to execute code that at previous been thought to be data, or there is an attempt to run JIT'd code which caused the vectorized exception handler at step 934 to be tripped. As stated previously, the vectorized exception handler will be tripped if there is JIT'd or ignored code being executed. However, if it is determined that the termination was caused by an attempt to hijack the software, process step 948 will notify process step 950 of parent process 902 to alert that determination was caused by a protection violation.

FIG. 10, generally at 1000, shows a representative flow diagram for the method by which the Native code is rewritten by rewriter 1002. Rewriter 1002 carries out the rewriting of the Native code preferably in four general steps. The steps are disassembly of the code, transformation of the disassembled code according to a rewriting algorithm, creation of the hash tables, and reassembling the code. These steps will now be described with respect to FIG. 10.

To initiate the binary rewriting of Program.exe, its native libraries, third-party libraries, and associated Windows DLLs, preferably, an authorized user on the computer would set the debugger string value, in the HKEY_LOCAL_MACHINE\SOFTWARE\Microsoft\Windows NT\CurrentVersion\Image File Execution Options\Program.exe registry folder to "% path %\Launcher.exe", or its equivalent in other operating system environments, where the path is the location of the rewriter installation on the computer.

Setting this debugger value for Program.exe, preferably, will cause the process of FIG. 7 to occur as described and prepare the execution environment for a modified Program.exe. The rewriter will execute for Program.exe during process step FIG. 924 of FIG. 9. The rewriter will execute for NTDLL and Helper.dll at process steps 914 and 916, respectively, in FIG. 9. The rewriter will execute for dependent libraries at process step 938 in FIG. 9.

In FIG. 10 at 230, the original Program.exe binary code is shown. The entry point for Program.exe is Entry Point-X, which is shown at 232, and the code and data of Program.exe are located at Loc. X, which is shown at 234. The Program.exe binary is input to rewriter 1002, which may be located locally or cloud-based. At process step 1004 of rewriter 1002, disassembly of the Program.exe binary code takes place. At this step, the binary code is broken into component sections and basic blocks, preferably, using a symbolic disassembler. For purposes of the present invention, "components sections" means an arrangement of basic blocks that roughly represent a function and "basic blocks" means a sequence of instructions where each instruction immediately follows from the preceding instruction and the sequence ends at a terminating instruction, such as an unconditional jump or a return.

According to the improved CFI system method the present invention, a preferable type of the disassembler uses a code traversal algorithm starting at the Program.exe entry point. The processing at this step will reveal all the pointers in the sections of the disassembled binary code. Once the pointers have been revealed, the process will conduct a recursive descent traversal on each of these pointers to ensure that all of the code sections are covered. During this process of conducting the recursive descent traversal on the pointers, there are determinations whether any of the sections are program data that cannot be executed.

In conducting the disassembly process, a confidence score is assigned to each basic block identified by the recursive descent traversal analysis. The magnitude of the score value indicates: (1) which is likely code, (2) which might be code, and (3) which is likely data. For the sections that are not assessed to be "likely code," the contents are marked as data and are loaded into non-executable memory upon the launch described with respect to FIG. 9.

All basic block identified in the disassembly process at step 1004 will be transmitted to the rewriting algorithm at process step 1006. The present invention transmits all basic blocks identified by the disassembly process in case there was a mistake in correctly characterizing code as data. Any mismatch that may have occurred is resolved by the binary's hash table and the vectorized exception handler. The disassembly process does not use debugging information, such as symbols because they are not always guaranteed to be present in programs that would benefit from the system of present invention. Instead relocation information is used, which is already required by full address space layout randomization ("ASLR"), because relocation information is a common baseline criteria across, for example, Windows programs.

The output of disassembly step 1004 is input into rewriter algorithm step 1006. More specifically, the disassembled basic blocks are output from disassembly step 1004 to an assembly file that is organized symbolically without location dependencies. As such, all pointers or function references are symbolic. Then, at rewriter algorithm process step 1006, a preferred transformation function is applied to the assembly file. Examples of transformation functions that may be implemented according to the present invention include, but are not limited to, a basic block randomization function, CFI function, and instruction substitution function. The basic block randomization function randomly reorders the placement of binary program elements. The CFI function inserts CFI stubs in appropriate locations around basic blocks. The instruction substitution function replaces a group of instructions with logically equivalent instructions that are different but provide an effective way to mask program vulnerabilities.

After processing by the rewriter algorithm, step 1006 uses an assembler to create object code from the assembly file. The result is the rewritten code that is shown at 1008 of FIG. 10, which is now located at Loc. Y.

After rewriter algorithm process step 1006, the next step is the hash table creation step at 1010. At this step, for each function pointer identified during disassembly step 1004, an entry is made in the hash table that gives the location of the corresponding rewritten code section in the total group of rewritten code sections. The result is the hash table is shown at 1012 that is located at Loc. Z.

The final step of rewriter 1002 is the reassembly of the basic blocks of code at reassembly process step 1014. At this step, the code sections are properly associated and formatted for the appropriate operating system. For example, if the operating system is the Windows operating system, it would form a properly formatted PE file. The reassembled file is shown at 800. The entry point for the rewritten file is Entry Point-Y at 802. The original Native code is shown at 804. Rewritten code 1008 rewritten at rewriter algorithm step 1008 is shown at 806. And, hash table 1012 created at hash table creation step 1010 is shown at 808. The rewritten and reassembled file is stored in locally accessible rewritten DLL cache 1016.

As previously stated, the rewriting process can be done locally on the computer executing the code or in a cloud-based mechanism. In the case of cloud-based rewriting, the local computer will identify the binary needed to be rewritten and transmitted to the cloud-based system. If the cloud-based system has already seen this binary, a rewritten copy of the binary will be downloaded to the DLL cache. If the cloud-based system has not seen the binary before, the source binary will be uploaded for rewriting and then downloaded. The system and method the present invention provides protections to ensure that someone requesting rewriting of a binary must have the source binaries to download the rewritten binaries and to prevent software theft.

In order to summarize the modifications the CFI system and method of the present invention makes the normal binary execution process, FIG. 11 is provided, which is read in conjunction with FIGS. 7, 8, 9, and 10. The execution process for a binary, such as Program.exe, begins as described with respect to FIG. 9. As previously indicated, process step 944 of FIG. 9 includes a process substep 946, which is directed to execution of the protected Program.exe. Program.exe at that point is the original target program, Program.exe, after it has been processed according to the process described with respect to FIG. 10.

Referring to FIG. 11, generally at 1100, memory bitmap 1112 was formed according to process step 938 of FIG. 9. This bitmap includes a series of pointers to the hash table shown at 1122 for each NTDLL, Program.exe, and all these libraries. For example, memory bitmap 1112 shows representative hash table references to NTDLL at 1142, three native libraries at 1144, and three third party libraries at 1146. It is understood by a person of ordinary skill in the art that more or less than these references to hash table 1110 may be shown and still be within the scope of the present invention.

Again referring to FIG. 11, Library 1 is shown at 1114. This library is an externally dynamically linked library (DLL) used by the Program.exe. Also, this library has been rewritten by the binary modification process described in FIG. 9. The rewritten library is loaded into and processed by the vectorized exception handler at step 934 in FIG. 9.

With the background of the components of execution described above, the modified binary execution process of the present invention will be described with respect to FIG. 11. Program.exe 1102 at 1104 will be queried for its entry point, which will point to Loc. Y at 1108. At this point, program execution is turned over to the instructions at Loc. Y.

At some point during execution, a reference will be made to data stored in Program.exe. Since the system and method the present invention does not modify data references or instrumentation because of its cost in overhead, the offsets for the data will point to contents in the Native code section of Program.exe at Loc. X, which is in 1106. These references are still valid because the Native data has not changed its position as measured by an offset from the beginning of Program.exe.

After further execution of the binary, a reference may be made to an outside library, such as Library 1 at address 0x1. Since Program.exe does not have all the relocation information for Library 1 internally, the system and method the present invention makes use of the vectorized exception handler. As shown, the attempt to transfer execution to 0x1 in Library 1 will cause an access violation because the native section of code was loaded into non-executable memory because it was data.

In light of the violation, control may be transferred to vectorized exception handler 1124 to determine the cause of the violation. The first process element to receive the violation is access violation step 1126. At decision step 1128, it is determine if the violation was due to a non-executable ("NX") memory exception attempt. If the answer is no, the process will proceed to step 1130 where program will be allowed to terminate and not be classified as a violation. However, in the present case, it was an attempt to execute a non-executable and at process step 1132 the system will look up the hash table for Library 1 in memory bitmap 1112. Memory bitmap 1112 will resolve that the location for the Library 1 hash table 1122 would be Loc. Z. In hash table 1122 of Library 1, vectorized exception handler 1124 will use the Native code at address in Library 1, 0x1, to find the rewritten address in the executable section of the code. This lookup process is carried out at step 1134 of the vectorized exception handler.

At decision step 1136, there is a determination of whether there is a rewritten address for 0x1 in hash table 1122. If there is no entry, then the attempt to jump to that section of the code was malicious and the improved CFI system and method the present invention will trigger a violation flag as shown at 1138. If there is an entry in the hash table as shown at 1122, which points to an entry in the rewritten code in rewritten code 1120, execution is turned over to the address in the rewritten code as shown at 1140 of vectorized exception handler 1124. Since there is a mapping, the instruction pointer is set to 0xB and binary execution continues.

The process just described is also carried out for jumps to code in Program.exe that was not modified in the rewriting stage. This applies to code such as JIT'd code or other types like it. These types of code cannot be rewritten during binary modification because they are turned into binary code at runtime. Therefore, as long as the jump is to a legitimate function in the Native code section of Program.exe, the execution may be allowed to continue. If an attempt is to make a jump into a non-executable section of the Native code, i.e., data, or to the middle of executable code, there will be no hash table entry for the location and thereby generate a violation.

It is understood by a person of order a skilled the art that the improved CFI system and method the present invention can be implemented by computer application publishers, e.g., Adobe, to make their applications more robust. Further, enterprises can use binary modification tools to add the improved CFI system and method of the present invention to publishers' computer applications used by enterprises. Further, the improved CFI system and method of the present invention can be added to any operating system and thus make intrinsic all of its programs, e.g., like ASLR and data execution prevention ("DEP") are added to many operating systems.

The embodiments or portions thereof of the system and method of the present invention may be implemented in computer hardware, firmware, and/or computer programs executing on programmable computers or servers that each includes a processor and a storage medium readable by the processor (including volatile and non-volatile memory and/or storage elements). Any computer program may be implemented in a high-level procedural or object-oriented programming language to communicate within and outside of computer-based systems.

Any computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the embodiments. The embodiments, or portions thereof, may also be implemented as a machine-readable storage medium, configured with a computer program, where, upon execution, instructions in the computer program cause a machine to operate to perform the functions of the embodiments described above.

The embodiments, or portions thereof, of the system and method of the present invention described above may be used in a variety of applications. Although the embodiments, or portions thereof, are not limited in this respect, the embodiments, or portions thereof, may be implemented with memory devices in microcontrollers, general purpose microprocessors, digital signal processors (DSPs), reduced instruction-set computing (RISC), and complex instruction-set computing (CISC), among other electronic components. Moreover, the embodiments, or portions thereof, described above may also be implemented using integrated circuit blocks referred to as main memory, cache memory, or other types of memory that store electronic instructions to be executed by a microprocessor or store data that may be used in arithmetic operations.

The descriptions are applicable in any computing or processing environment. The embodiments, or portions thereof, may be implemented in hardware, software, or a combination of the two. For example, the embodiments, or portions thereof, may be implemented using circuitry, such as one or more of programmable logic (e.g., an ASIC), logic gates, a processor, and a memory.

Various modifications to the disclosed embodiments will be apparent to those skilled in the art, and the general principals set forth below may be applied to other embodiments and applications. Thus, the present invention is not intended to be limited to the embodiments shown or described herein.

The invention claimed is:

1. A two-tiered computer-based security method for protecting binary code and associated libraries from access by unauthorized users during loading of the binary code and associated libraries and launching the binary code and associated libraries, comprising the steps of:
   (A) at a first tier of the method, an operating system loading a launcher program for overseeing the launching of the binary code and associated binary code libraries to be protected, the launcher program being loaded by,
      (1) the operating system requesting a computer registry to load the binary code and associated libraries to be protected;
      (2) the computer registry redirecting the loading of the launcher program and associated libraries in place of the binary code and associated libraries to be protected,
      (3) the operating system loading the launcher program and associated libraries, and
      (4) the operating system running the launcher program and associated libraries for input to and controlling a second tier of the method, and
   (B) at the second tier of the method, the operating system running the launcher program to oversee modification of the binary code and associated libraries to be protected by,
      (1) the operating system loading the binary code and associated libraries,
      (2) the operating system under the control of the launcher program rewriting the binary code and associated binary code libraries, with the rewriting of the binary code and associated libraries being such that the operating functionality of the binary code and associated libraries remain substantially the same and with the binary code and associated libraries being located at a new location in system memory as controlled by the launcher program,
      (3) the operating system under the control of the launcher program generating and storing a hash table which contains a mapping to redirect calls and returns for indirect control flow transfers from the binary code and associated libraries to the rewritten binary code and rewritten associated binary code libraries, with knowledge of the redirection being controlled by the launcher program, and
      (4) the operating system running the protected binary code and associated libraries in the form of the rewritten binary code and rewritten associated libraries.

2. The method according to claim 1, further comprising rewriting library loading paths.

3. The method according to claim 1, further comprising rewriting NTDLL.

4. The method according to claim 1, further comprising rewriting Helper.dll.

5. The method according to claim 1, further comprising listening for faults, by the launcher program.

6. The method according to claim 1, further comprising loading the binary code and associated libraries into non-executable memory.

7. The method according to claim 1, further comprising loading the hash table into non-executable memory.

8. A system for protecting binary code and associated libraries from access by unauthorized users during loading of the binary code and associated libraries and launching the binary code and associated libraries, comprising one or more computer processors coupled to a memory, configured to:
   (A) load a launcher program for overseeing the launching of the binary code and associated binary code libraries to be protected, the launcher program being configured to be loaded by,
      (1) requesting a computer registry to load the binary code and associated libraries to be protected;
      (2) redirecting, via the computer registry, the loading of the launcher program and associated libraries in place of the binary code and associated libraries to be protected,
      (3) loading the launcher program and associated libraries, and
      (4) running the launcher program and associated libraries for input to and controlling the binary code and associated libraries, and
   (B) run the launcher program to oversee modification of the binary code and associated libraries to be protected by,
      (1) loading the binary code and associated libraries,
      (2) under the control of the launcher program, rewriting the binary code and associated binary code libraries, with the rewriting of the binary code and associated libraries being such that the operating functionality of the binary code and associated libraries remain substantially the same and with the binary code and associated libraries being located at a new location in system memory as controlled by the launcher program,
      (3) under the control of the launcher program, generating and storing a hash table which contains a mapping to redirect calls and returns for indirect control flow transfers from the binary code and associated libraries to the rewritten binary code and rewritten associated binary code libraries, with knowledge of the redirection being controlled by the launcher program, and (4) running the protected binary code and associated libraries in the form of the rewritten binary code and rewritten associated libraries.

9. The system according to claim 8, wherein the launcher program is configured to rewrite library loading paths.

10. The system according to claim 8, wherein the launcher program is configured to rewrite NTDLL.

11. The system according to claim 8, wherein the launcher program is configured to rewrite Helper.dll.

12. The system according to claim 8, wherein the launcher program is configured to listen for faults.

13. The system according to claim 8, wherein the launcher program is configured to load the binary code and associated libraries into non-executable memory.

14. The system according to claim 8, wherein the launcher program is configured to load the hash table into non-executable memory.

15. An article of manufacture for protecting binary code and associated libraries from access by unauthorized users during loading of the binary code and associated libraries and launching the binary code and associated libraries, the article of manufacture comprising:

at least one non-transitory processor readable hardware storage medium; and instructions stored on the at least one medium;

wherein the instructions are configured to be readable from the at least one medium by at least one processor and thereby cause the at least one processor to operate so as to:

(A) load a launcher program for overseeing the launching of the binary code and associated binary code libraries to be protected, the launcher program being loaded by, (1) requesting a computer registry to load the binary code and associated libraries to be protected;

(2) redirecting, by the computer registry, the loading of the launcher program and associated libraries in place of the binary code and associated libraries to be protected, (3) loading the launcher program and associated libraries, and (4) running the launcher program and associated libraries for input to and controlling the binary code and associated libraries, and (B) run the launcher program to oversee modification of the binary code and associated libraries to be protected by, (1) loading the binary code and associated libraries, (2) under the control of the launcher program, rewriting the binary code and associated binary code libraries, with the rewriting of the binary code and associated libraries being such that the operating functionality of the binary code and associated libraries remain substantially the same and with the binary code and associated libraries being located at a new location in system memory as controlled by the launcher program, (3) under the control of the launcher program, generating and storing a hash table which contains a mapping to redirect calls and returns for indirect control flow transfers from the binary code and associated libraries to the rewritten binary code and rewritten associated binary code libraries, with knowledge of the redirection being controlled by the launcher program, and (4) run the protected binary code and associated libraries in the form of the rewritten binary code and rewritten associated libraries.

16. The article of manufacture of claim 15, wherein the instructions are further configured to cause the at least one processor to operate so as to rewrite library loading paths.

17. The article of manufacture of claim 15, wherein the instructions are further configured to cause the at least one processor to operate so as to rewrite NTDLL.

18. The article of manufacture of claim 15, wherein the instructions are further configured to cause the at least one processor to operate so as to rewrite Helper.dll.

19. The article of manufacture of claim 15, wherein the instructions are further configured to cause the at least one processor to operate so as to listen for faults, by the launcher program.

20. The article of manufacture of claim 15, wherein the instructions are further configured to cause the at least one processor to operate so as to load the hash table into non-executable memory.

21. The method according to claim 1, further comprising inserting a stub before an indirect control transfer.

* * * * *